(12) United States Patent
Xu et al.

(10) Patent No.: US 9,036,123 B2
(45) Date of Patent: May 19, 2015

(54) ARRAY SUBSTRATE AND LIQUID CRYSTAL DISPLAY

(71) Applicant: BOE TECHNOLOGY GROUP CO., LTD., Beijing (CN)

(72) Inventors: Xiaoling Xu, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 142 days.

(21) Appl. No.: 13/805,140

(22) PCT Filed: Oct. 29, 2012

(86) PCT No.: PCT/CN2012/083706
§ 371 (c)(1),
(2) Date: Dec. 18, 2012

(87) PCT Pub. No.: WO2013/078930
PCT Pub. Date: Jun. 6, 2013

(65) Prior Publication Data
US 2014/0071369 A1  Mar. 13, 2014

(30) Foreign Application Priority Data
Dec. 1, 2011 (CN) .................. 2011 2 0493476 U

(51) Int. Cl.
*G02F 1/1343* (2006.01)
*G02F 1/1362* (2006.01)
*G02F 1/1368* (2006.01)

(52) U.S. Cl.
CPC ........ *G02F 1/136286* (2013.01); *G02F 1/1343* (2013.01); *G02F 1/1362* (2013.01); *G02F 1/1368* (2013.01)

(58) Field of Classification Search
CPC .......................................... G02F 2001/134372
USPC ....................................................... 349/141
See application file for complete search history.

(56) References Cited

U.S. PATENT DOCUMENTS

| 2010/0118248 A1 | 5/2010 | Yoshida et al. |
| 2011/0216262 A1 | 9/2011 | Nagata |
| 2014/0104531 A1* | 4/2014 | Kim et al. ........................ 349/43 |

FOREIGN PATENT DOCUMENTS

| CN | 101484845 A | 7/2009 |
| CN | 101561602 A | 10/2009 |

(Continued)

OTHER PUBLICATIONS

International Search Report mailed Jan. 31, 2013; PCT/CN2012/083706.

(Continued)

*Primary Examiner* — James Dudek
(74) *Attorney, Agent, or Firm* — Ladas & Parry LLP

(57) ABSTRACT

The embodiments of the invention provide an array substrate and a liquid crystal display. The array substrate comprises a gate line and a data line intersecting with each other to define a pixel unit, a plate-like electrode in the pixel unit, an electrode with slits and a thin film transistor. An alignment film is provided on the array substrate. Within the pixel unit, an end of the electrode with slits away form a region of the TFT along the data line has an outer first side and an inner second side. The outer first side, the inner second side and a third side of the gate line of an adjacent pixel unit are perpendicular to a rubbing direction of the alignment film.

4 Claims, 2 Drawing Sheets

(56) References Cited

FOREIGN PATENT DOCUMENTS

| | | |
|---|---|---|
| CN | 102053411 A | 5/2011 |
| CN | 202351591 U | 7/2012 |

OTHER PUBLICATIONS

International Preliminary Report on Patentability dated Jun. 3, 2014; PCT/CN2012/083706.

* cited by examiner

ARRAY SUBSTRATE AND LIQUID CRYSTAL DISPLAY

TECHNICAL FIELD

Embodiments of the invention relate to an array substrate and a liquid crystal display.

BACKGROUND

Advanced Super Dimension Switching (ADS) liquid crystal display (LCD) is used to increase light transmittance of the LCD device across a plane. A multi-dimensional electric field is formed with both an electric field produced at edges of slit electrodes in the same plane and an electric field produced between a slit electrode layer and a plate-like electrode layer, so that liquid crystal molecules at all orientations, which are located directly above the electrodes and between the slit electrodes in a liquid crystal cell, can be rotated, which enhances the work efficiency of liquid crystals and increases the light transmittance. The Advanced Super Dimensional Switching technology can improve the image quality of thin film transistor liquid crystal displays (TFT-LCDs) and has advantages of high transmittance, wide viewing angle, high aperture ratio, low chromatic aberration, being free of push Mura, etc.

For the conventional ADS mode TFT-LCD, there is an angle between the rubbing direction of the alignment film and the horizontal direction. When the TFT-LCD is powered off, most of the liquid crystal molecules in the liquid crystal layer are arranged in the rubbing direction of the alignment film, thereby a good dark state is maintained. However, when the TFT-LCD is powered on, due to wires (such as data lines, gate lines and the like) and electrodes (such as source electrode, gate electrode and the like) existing at the edge of the pixel unit, a relatively complex electric field may be generated among those wires and electrodes, and in this case, the liquid crystal molecules at the edge of the pixel unit may be arranged according to the direction of this electric field but not the rubbing direction of the alignment film.

As shown in FIG. 1, a TFT array substrate 1 comprises a gate line 11 and a data line 12 intersecting with each other to define a pixel unit, a pixel electrode 13 in the pixel unit, and a common electrode 14 with slits. A relatively complex electric field may be generated among the gate line 11, the data line 12, the pixel electrode 13 and the common electrode 14. Under the effect of this electric field, the liquid crystal molecules in the region A of FIG. 1 may be arranged according to the direction of this electric field but not according to the rubbing direction of the alignment film. Thus, when the TFT-LCD is powered on, it may not be avoided that light leakage under dark state occurs in the region A.

SUMMARY

According to one embodiment of the invention, an array substrate is provided. The array substrate comprises a gate line and a data line intersecting with each other to define a pixel unit, a plate-like electrode in the pixel unit, an electrode with slits and a thin film transistor. An alignment film is provided on the array substrate. Within the pixel unit, an end of the electrode with slits away from a region of the TFT along the data line has an outer first side and an inner second side. The outer first side, the inner second side and a third side of the gate line of an adjacent pixel unit are perpendicular to a rubbing direction of the alignment film. The inner second side is located at the slits of the electrode with slits, and the third side is a side of the gate line of the adjacent pixel unit which is closest to the outer first side.

According to another embodiment of the invention, a liquid crystal display is provided. The liquid crystal display comprises the array substrate described above, a counter substrate and a liquid crystal layer sandwiched between the array substrate and the counter substrate.

In the embodiments of the invention, within the pixel unit, the outer first side and the inner second side of the end of the electrode with slits away from the TFT region along the data line direction are parallel to the third side of the gate line of the adjacent pixel unit. The inner second side is located at the slits of the electrode with slits, and the third side is the side of the gate line of the adjacent pixel unit which is closest to the outer first side. The first side, the second side and the third side are perpendicular to the rubbing direction of the alignment film. Since the relative position and the shape of the electrode with slits and the gate line are changed compared with the convention array substrate, when the liquid crystal panel is powered on, the electric field at the edges away from the TFT region in the pixel unit is changed and the arrangement of the liquid crystal molecules at these edges is accordingly changed. In this case, the liquid crystal molecules at these edges can be arranged according to the rubbing direction of the alignment film, thus light leakage under dark state can be avoided in a simple manner.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The following description is conducted mainly with respect to a single pixel unit, but other pixel units may be formed similarly.

Figure 2:
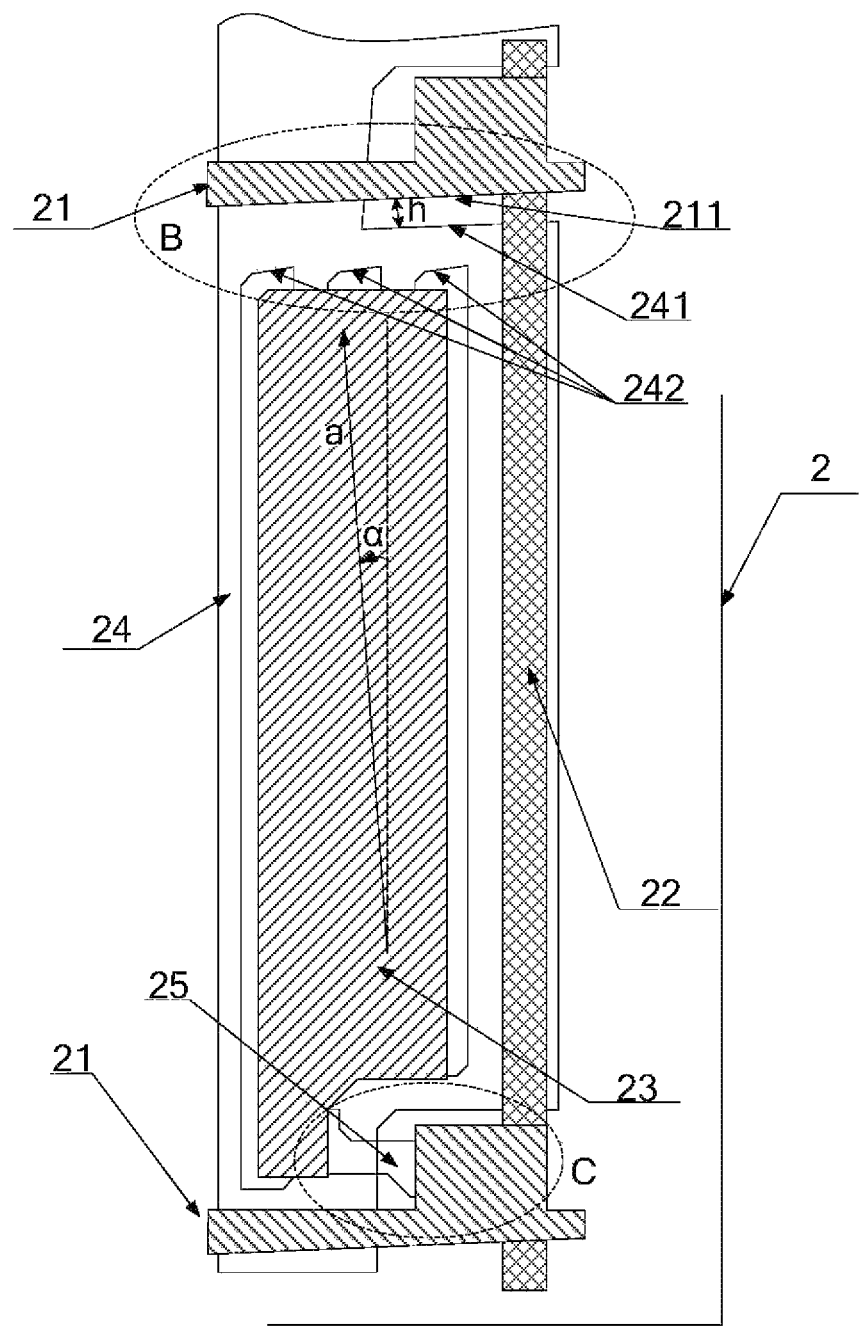
FIG. 2 is a partial schematic view showing an array substrate according to an embodiment of the invention.

FIG. 2 is a partial schematic view showing an array substrate according to an embodiment of the invention. As shown in FIG. 2, the array substrate 2 comprises a gate line 21 and a data line 22 intersecting with each other to define a pixel unit, a pixel electrode 23 in the pixel unit, a common electrode 24 with slits, and a thin film transistor TFT 25.

Within the pixel unit, an end of the common electrode 24 away from a TFT region C along the data line direction has an outer side 241 (referred as a first side) and an inner side 242 (referred as a second side). The outer side (the first side) 241 and the inner side (the second side) 242 are parallel to a side 311 (referred as a third side) of the gate line 21 of an adjacent pixel unit. The TFT region C is a region in which the TFT 25 is provided. The inner side (the second side) 242 is located at the slits of the common electrode 24. The side 211 (the third side) is a side of the gate line 21 of the adjacent pixel unit which is closest to the outer side 241 (the first side).

In addition, an alignment film (not shown) is provided on the array substrate. The first side 241, the second side 242, the third side 211 are all perpendicular to a rubbing direction of the alignment film. In this case, when the liquid crystal panel is powered on, an electric field parallel to the rubbing direction of the alignment film is generated between any two of these three sides. Under this electric field, the liquid crystal molecules can be arranged according to the direction of the electric field, that is, the liquid crystal molecules can be arranged according to the rubbing direction of the alignment film.

For example, as shown in FIG. 2, an angle α between the rubbing direction a of the alignment film and the data line 22 is 7°. Thus, when the first side 241 and the second side 242 of the common electrode and the third side 211 of the gate line of the adjacent pixel unit are perpendicular to the rubbing direction a of the alignment film in the embodiment, the smaller angle among the angles formed by those three sides and the data line 22 is 83°.

In the array substrate with the above-described structure, the relative positions of the common electrode, the gate line and the alignment film are changed. Thus, when the liquid crystal panel is powered on, the liquid crystal molecules at the first side 241 and the second side 242 of the common electrode away from the TFT region C (i.e. the liquid crystal molecules at a region B in FIG. 2) can be arranged according to the rubbing direction of the alignment film, and thereby light leakage under dark state can be avoided in a simple manner.

In addition, in the array substrate with the above-described structure, the light transmittance region of the pixel unit is not changed, and thus the aperture ratio of the pixel unit can be maintained.

Figure 1:
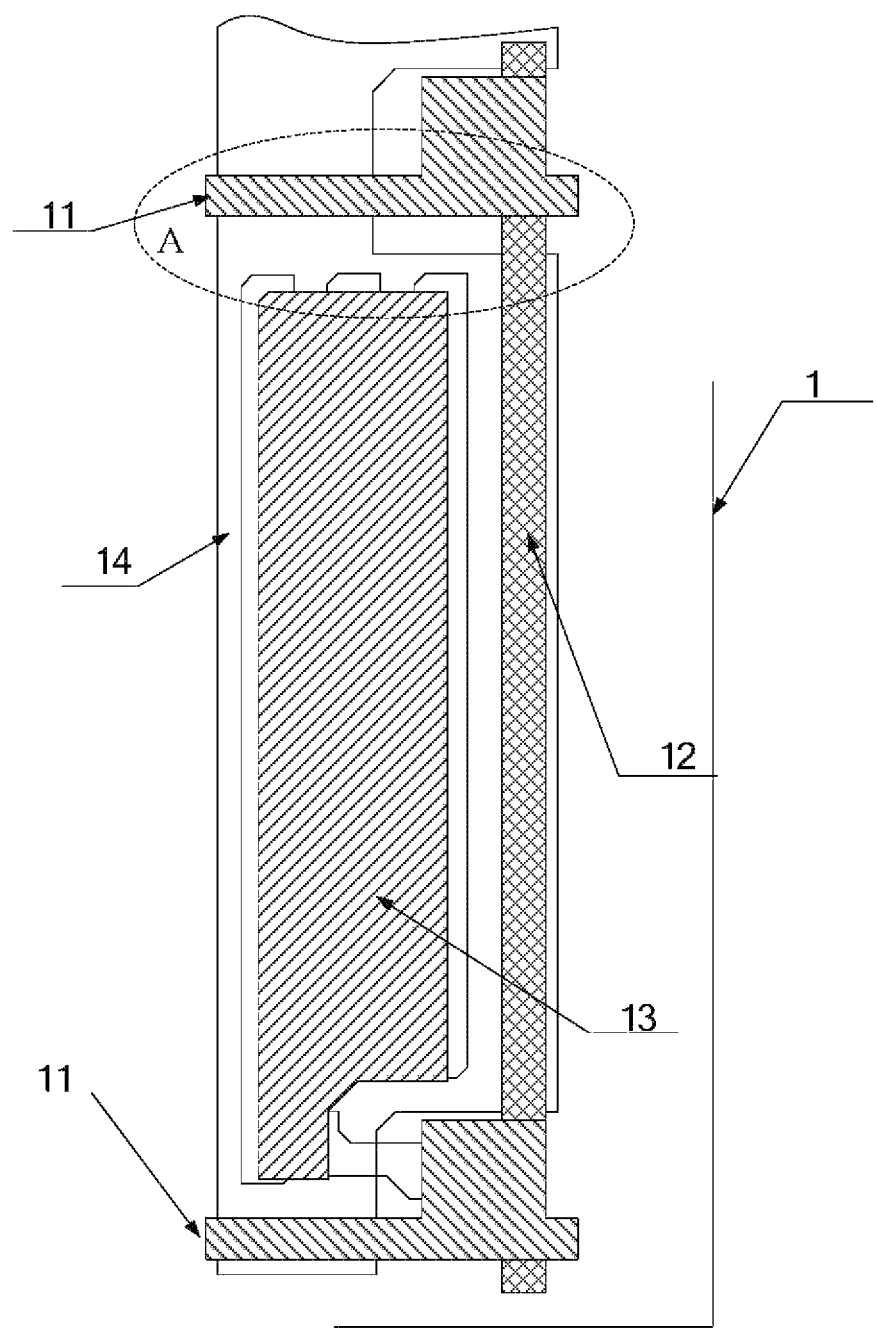
FIG. 1 is a partial schematic view showing a conventional array substrate.

Furthermore, in the embodiment, a distance h between the first side 241 and the third side 211 is 5-10 μm. That is, compared with the conventional common electrode (shown in FIG. 1), the common electrode 24 in the embodiment is moved upward (i.e., moved toward the gate line of the adjacent pixel unit), such that the distance h between the first side 241 of the common electrode 24 and the third side 211 of the gate line 21 is decreased to 5-10 μm.

In the array substrate according to the embodiment of the invention, within the pixel unit, the outer first side and the inner second side of the end of the common electrode away from the TFT region C along the data line direction are parallel to the third side of the gate line of the adjacent pixel unit. The inner second side is located at the slits of the common electrode, and the third side is the side of the gate line of the adjacent pixel unit which is closest to the outer first side. The first side, the second side and the third side are perpendicular to the rubbing direction of the alignment film. The distance between the first side and the third side is 5-10 μm.

Since the relative position and the shape of the common electrode and the gate line are changed compared with the convention array substrate, when the liquid crystal panel is powered on, the electric field in the region B away from the TFT region C in the pixel unit is changed and the arrangement of the liquid crystal molecules in the region B is accordingly changed. In this case, the liquid crystal molecules in the region B can be arranged according to the rubbing direction of the alignment film, thus light leakage under dark state can be avoided in a simple manner.

In the above description, the pixel electrode 23 is an example of a plate-like electrode in the embodiment of the invention, and the common electrode 24 with slits is an example of an electrode with slits in the embodiment of the invention.

According to an embodiment of the invention, a liquid crystal display is further provided. The liquid crystal display comprises the array substrate described above, a counter substrate and a liquid crystal layer sandwiched between the array substrate and the counter substrate.

The embodiments of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. An array substrate, comprising a gate line and a data line intersecting with each other to define a pixel unit, a plate-like electrode in the pixel unit, an electrode with slits and a thin film transistor, and an alignment film being provided on the array substrate, wherein
within the pixel unit, an end of the electrode with slits away from a region of the TFT along the data line has an outer first side and an inner second side;
the outer first side, the inner second side and a third side of the gate line of an adjacent pixel unit are perpendicular to a rubbing direction of the alignment film;
the inner second side is located at the slits of the electrode with slits, and the third side is a side of the gate line of the adjacent pixel unit which is closest to the outer first side; and
an angle between the rubbing direction of the alignment film and the data line is 7°.

2. The array substrate according to claim 1, wherein the outer first side and the inner second side are parallel to the third side.

3. The array substrate according to claim 1, wherein the outer first side is moved toward the gate line of the adjacent pixel unit, such that a distance between the outer first side and the third side is 5-10 μm.

4. A liquid crystal display, wherein the liquid crystal display comprises the array substrate according to claim 1, a counter substrate and a liquid crystal layer sandwiched between the array substrate and the counter substrate.

* * * * *